United States Patent [19]

Bush

[11] Patent Number: 5,070,427
[45] Date of Patent: Dec. 3, 1991

[54] THERMAL SWITCH FOR BATTERY PROTECTION

[75] Inventor: Carroll H. Bush, Jackson, Mich.

[73] Assignee: Sparton Corporation, Jackson, Mich.

[21] Appl. No.: 473,040

[22] Filed: Jan. 31, 1990

[51] Int. Cl.[5] .............................................. H02H 5/04
[52] U.S. Cl. .................................. 361/104; 361/103; 337/407; 307/144; 320/36
[58] Field of Search ............... 361/103, 104, 274, 275; 307/144, 117; 337/407; 340/590, 584, 636; 320/36, 35, 11

[56] References Cited

U.S. PATENT DOCUMENTS 2,006,810 7/1935 Kunz ................................... 361/104
4,144,532 3/1979 Boyd ................................... 340/585
4,186,366 1/1980 McVey ................................ 337/407
4,771,270 9/1988 Kelso ................................... 340/590

Primary Examiner—A. D. Pellinen
Assistant Examiner—C. S. Schultz
Attorney, Agent, or Firm—Reising, Ethington, Barnard, Perry & Milton

[57] ABSTRACT

Lithium batteries are protected from a runaway condition marked by over-current and high temperature by a temperature sensor having a thermally conductive housing in thermal contact with all the cells of the battery and containing a fusible column which melts when a limit temperature is reached to open a switch in series with the battery. The switch may be the same switch which activates the circuit.

7 Claims, 2 Drawing Sheets

THERMAL SWITCH FOR BATTERY PROTECTION

FIELD OF THE INVENTION

This invention relates to a battery protector and particularly to a thermal switch for limiting battery temperature.

BACKGROUND OF THE INVENTION

A characteristic of lithium batteries is that should an over-current condition cause overheating, the temperature rise of the battery exacerbates the current rise and a runaway condition can occur. It is commonplace to require that such batteries be provided with thermal protectors which open the battery circuit in the event of a temperature rise beyond a set value.

It is known in fields other than battery protection that an alarm may be triggered when a limit temperature is reached by using a fusible element which holds a switch open at low temperatures and which melts at a limit temperature to permit the switch to close to activate an alarm. Examples of these devices are given by the U.S. Pat. No. 4,144,532 to Boyd for a Thaw Alarm for Food Freezer and the U.S. Pat. No. 4,771,270 to Kelso for a Temperature Sensitive Fire Alarm Unit. The former patent uses a congealed water-alcohol mixture to hold switch contacts apart and the latter uses a fusible cermet strip for the same purpose.

Prior devices for battery thermal protection include a small sensor subject to only one cell of a battery so that protection is sometimes denied in conditions where one cell in a battery is overheating. Those sensors also are subject to self heating by the battery current so that the temperature of the device reflects the current load as well as the cell temperature and can trigger a shut down before the temperature limit is reached. This is a particular problem where an application requires large current pulses which heat the sensor much more than the battery.

SUMMARY OF THE INVENTION

It is therefore an object of the invention to provide a thermal protector which is responsive to each cell of a battery. It is another object to provide such a thermal switch which is responsive to temperature and unresponsive to battery current per se. Still another object of the invention is to provide such thermal protection through the use of a switch provided primarily for other purposes.

The invention is carried out by providing an elongated thermally conductive housing in thermal contact with each cell of a battery, and containing a fusible material which melts when any cell reaches a set temperature, and a switch in circuit with the battery which is caused to open when the material melts. The invention further comprehends that the switch may be the switch used for circuit activation.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

One application of the thermal battery protection scheme of the invention is in sonobuoys which are dropped on the ocean surface and which then deploy hydrophones which sink to prescribed depths to sense pressure and acoustic signals. Both the hydrophone which collects data underwater and the buoy which remains on the surface to transmit the data by radio signals may contain lithium batteries. It is desired to use thermal protection during storage and transportation of the sonobuoys prior to use as well as during use and after retrieval. The disclosed embodiments of the invention are designed with such an application in mind but it will be apparent that the battery thermal protection has a wide scope of application.

Figure 1:
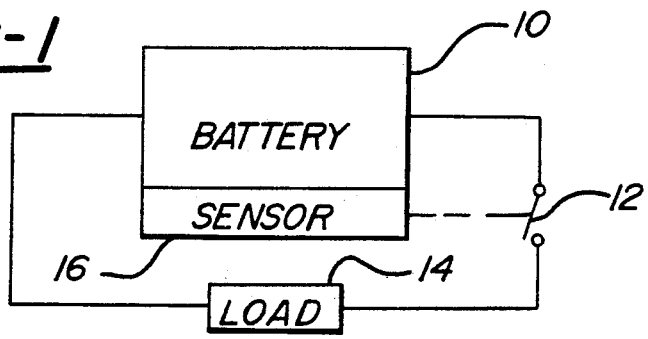
FIG. 1 is a block diagram of a battery operated circuit equipped with battery thermal protection according to the invention.

FIG. 1 illustrates a battery 10 connected through a normally open switch 12 to a load 14. The switch 12, of course, is closed during circuit operation and, as will be further explained, may be an activation switch which initially starts the circuit operation. A sensor 16 in contact with the battery 10 detects cell temperature and is mechanically connected to the switch 12 to open the circuit when an over-temperature condition is detected.

Figure 2:
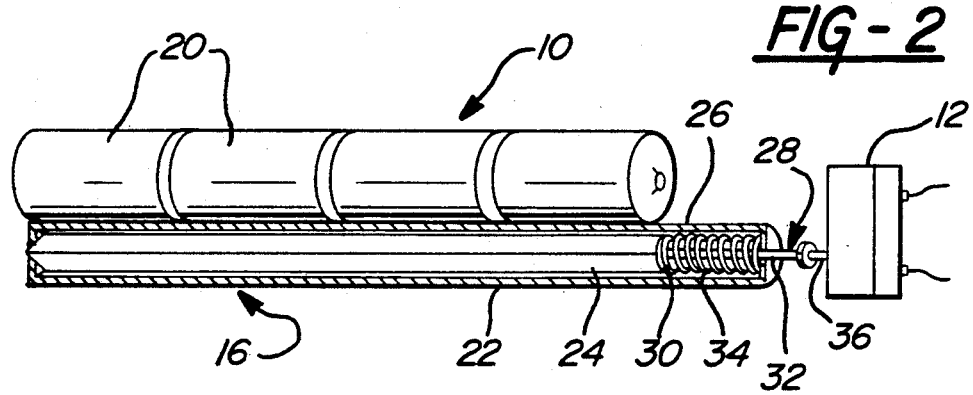
FIG. 2 is a partially broken away isometric view of a battery and thermal protector of FIG. 1.

The battery 10, as shown in FIG. 2, comprises a plurality of lithium cells 20 stacked in a linear array and the sensor 16 is an elongated device in thermal contact with all the cells 20. The sensor 16 has a tubular housing 22 of aluminum or other good heat conducting material and contains a column 24 of fusible material that is coextensive with the battery. One end 26 of the housing 22 extends beyond the battery 10 and contains an actuator or plunger 28 having a head 30 bearing on the column 24 and a stem 32 which projects through an aperture in the end of the housing. A coil spring 34 is compressed between the head 30 and the end of the housing and surrounds the stem 32. The plunger 28 is thus forced by the spring 34 against the column 24. The stem 24 engages the switch arm or operator button 36 or other operator on the switch 12 which may be a microswitch, for example, to hold the switch closed.

The fusible material used for the column 24 is any material which melts at the desired cutoff temperature. The temperature may depend on the application but 91° C. is often used as the cutoff temperature. Wax formulations are one material that is useful for this application. Indium alloys are also known for use as low temperature fusible elements and can be used as the column material. The column 24 is triangular in cross section with the apices in secure contact with the inner wall of the housing 22. Shapes other than triangular may be used so long as there is sufficient space in the housing to allow for expansion of the material upon melting and to allow the column to collapse under pressure from the plunger 28 and spring 34 when any portion of it melts through. A force fit of the column 24 within the housing 22 assures good thermal contact and also provides shock and vibration resistance.

In operation, the switch is initially held closed by the actuator of the sensor 16. If an over-current condition occurs and the battery temperature rises to the cutoff point, the housing also heats up to the melting point of the column 24 of fusible material. When the column melts, the plunger is pushed further into the housing 22 to withdraw the stem from the switch 12 operator allowing the switch to open and interrupt the current. Of course the entire column does not have to melt to effect opening of the switch but only enough to allow the plunger to release the switch.

Figure 3:
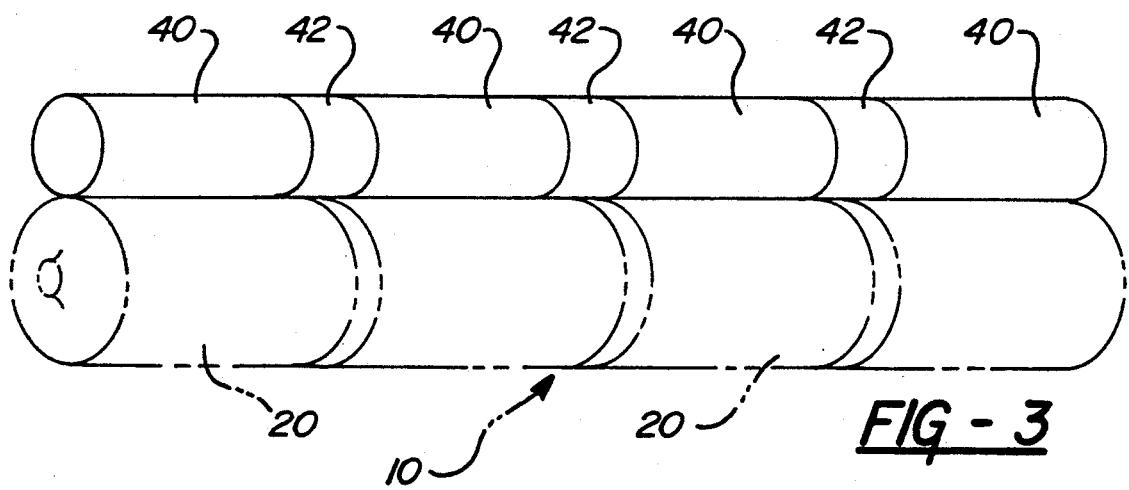
FIG. 3 is a view of an alternate housing for the protector of FIG. 2.

In some cases one cell of a battery runs hotter than the others as when the cell is leaking electrolyte or otherwise deteriorating. Its effect on the fusible column is delayed because the heat is dissipated along the heat conductive housing. To obtain preferential heating in the locale of the hot cell the housing is supplied with thermal barriers which interfere with heat conduction in the axial direction. As shown in FIG. 3, the tubular housing is formed of a stack of short tubes, alternating good and poor thermal conductors. For example, four aluminum tubes 40 aligned and in contact with the four cells 20 are joined by three polymer tubes 42 or bands with insulating properties. Then the heat from the hottest cell will heat the fusible material nearest it without significantly heating the neighboring portions.

Figure 4:
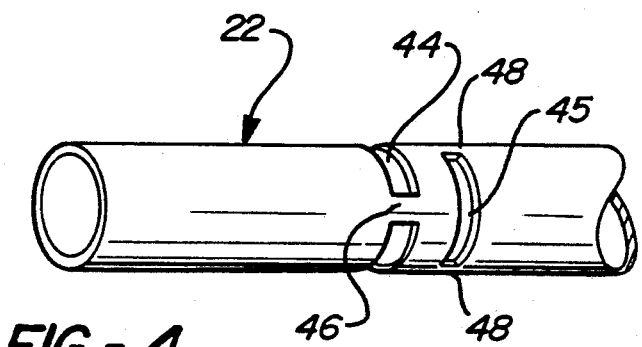
FIG. 4 is a partial view of another alternate housing for the protector of FIG. 2.

Another type of thermal block for preventing axial heat flow along the housing is a pattern of circumferential cuts or slots in the aluminum housing as shown in FIG. 4. The slots are in the region of the housing at the cell interfaces. A pair of slots 44 in one plane of the tubular housing define two narrow diametrically opposed bridge portions 46 and a second pair of slots 45 like the first pair and angularly offset by 90 degrees define two other offset bridge portions 48 so that a labyrinthine heat flow path reduces the heat flow along the length of the housing 22.

Figure 5:
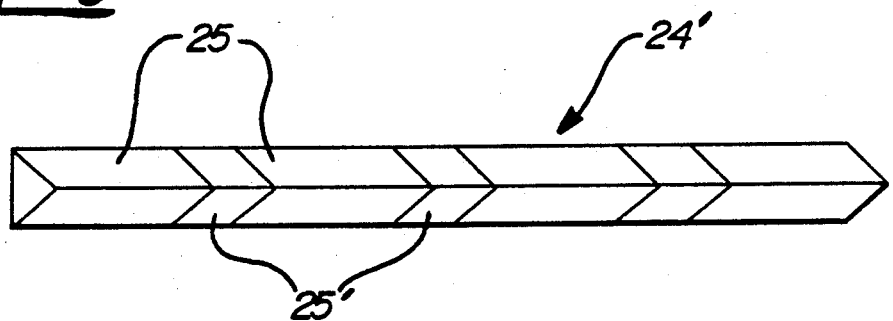
FIG. 5 is a view of an alternate fusible column for the thermal protector of FIG. 2.

Another source of thermal delay is heat flow along the fusible column. This may occur especially where the fusible material is a metal. Thermal barriers can be included in the column 24' as shown in FIG. 5. Segments 25 of meltable material are separated by segments 25' of heat insulating material. Where an expensive material is used as the fusible segments 25, this structure has the further advantage of reducing the amount of expensive material.

The switch 12 need not be a separate switch added to the circuit but may comprise the switch for turning the circuit operation on or off. In general the switch is held in a standby state or open position by a standby means such as a spring or a rigid element and the standby means is overcome by the circuit activating agent to allow the switch to close by pressing the switch operating button against the plunger, as illustrated in FIGS. 6 and 7.

Figure 6:
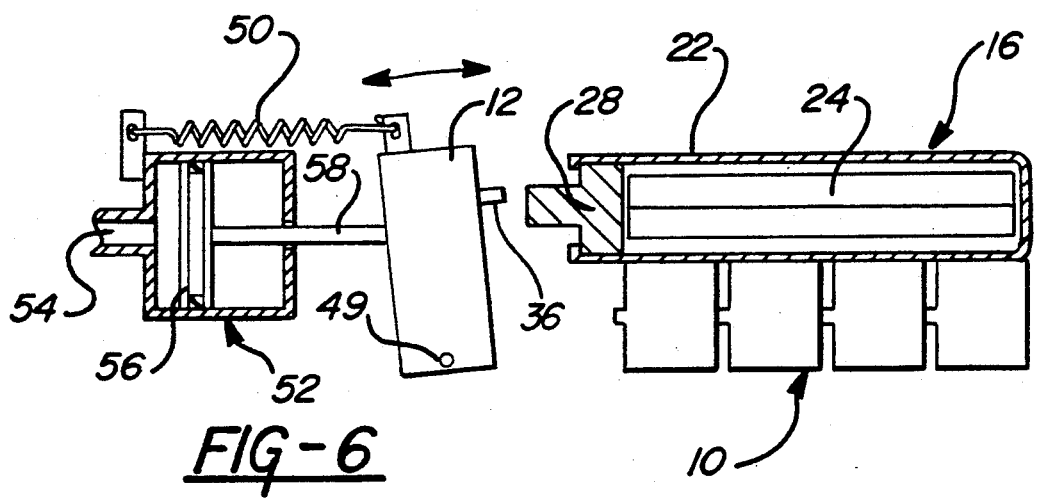
FIGS. 6 and 7 are views of embodiments of the invention integrating the thermal protection switch and the circuit activation switch.

FIG. 6 shows a switch 12 rotatably mounted on a pivot 49 and held in open condition by a standby spring 50 so that the operator button 36 does not touch the plunger 28 of the sensor 16. A pressure operated actuator 52 has a port 54 for admitting fluid under pressure and a movable element such as a piston 56 with a shaft 58 extending to and engaging the switch 12. When pressure is applied to the port 54, the piston is advanced to pivot the switch 12 to press the operator button 36 against the plunger 28. Thus the switch 12 is closed and the sensor 16 is operative to limit the battery temperature. In the event the pressure is removed from the port 54 the piston 56 and the switch 12 are retracted by the spring 50 to open the switch. An application of this device is in a hydrophone deployed in the ocean. When the hydrophone reaches a certain depth the pressure overcomes the spring 50 to close the switch 12. In the event the hydrophone is recovered, the release of the pressure causes the switch 12 to be opened. Since the water pressure pushes the switch against the plunger 28 and pushes the plunger against the fusible column 24, a spring within the housing 22 is not necessary.

Figure 7:
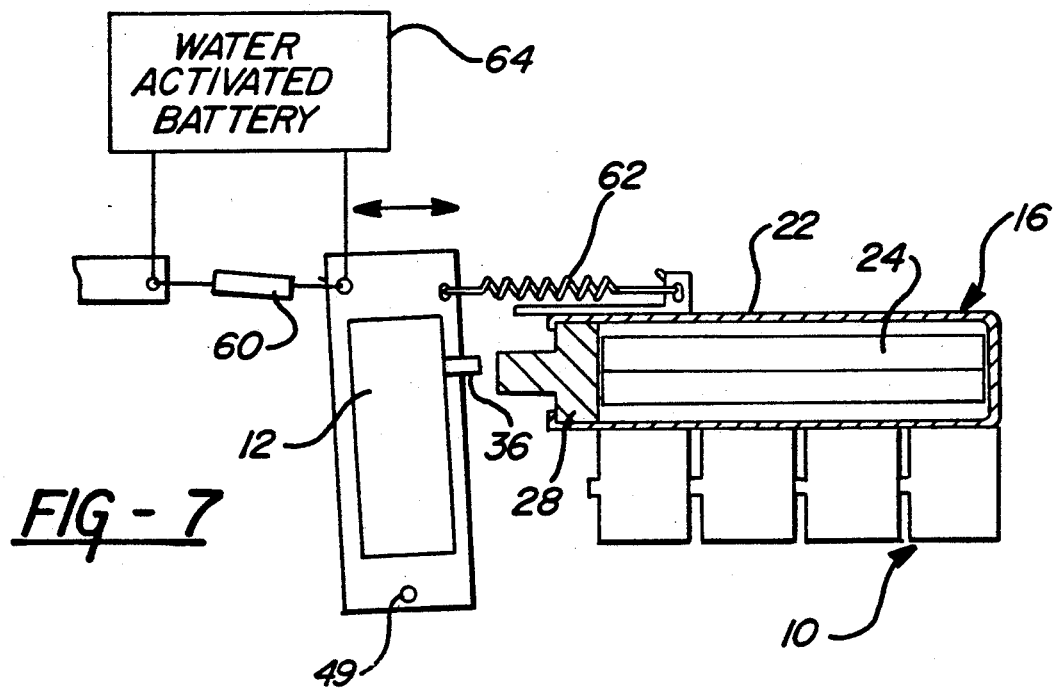

Another example of using the switch 12 for over-current protection and for activating the circuit is shown in FIG. 7. The switch 12 is mounted on a pivot 49 as in the previous example but is held open by a standby element comprising a fusible link 60 and is biased toward the plunger 28 of the sensor 16. A sea water activated battery 64 in circuit with the fusible link 60 is effective when immersed in sea water to supply current to the link 60 causing it to melt. Then the spring 62 pivots the switch 12 so that its operator button 36 presses on the plunger 28 to close the circuit and arm the sensor. The application for this device is in sonobuoys which are dropped into the ocean and the water activated battery 64 is energized to fuse the link 60 and close the switch 12. A variant on this scheme is the use of a meltable cord to hold the switch open and a resistor in circuit with the water activated battery 64 and in thermal contact with the cord. When the battery 64 is activated by sea water the resistor heats enough to melt the cord thereby releasing the switch 12.

It will thus be seen that the invention provides a thermal protection for a battery which can use a variety of fusible materials and which monitors each cell in the battery. Further the cutoff switch for the thermal protector may be the circuit activation switch.

The embodiments of the invention in which an exclusive property or privilege is claimed are defined as follows:

1. In a circuit powered by a battery having a plurality of cells stacked in a linear array, each cell being individually subject to overheating, means for limiting the cell temperature comprising:

a switch in series with the battery and being closed during circuit operation, and means for opening the switch when cell temperature exceeds a set value including:

an elongated metal tube thermally coupled with each cell in the array so that the tube is heated by each cell, said metal tube being segmented into isolated thermally conductive portions separated by regions of low thermal conductivity, each conductive portion corresponding to a respective cell and heated thereby.

a fusible material in the tube subject to the temperature of the tube for melting substantially at the set value, and actuator means including a plunger in the tube and bearing against the fusible material for normally holding the switch closed and opening the switch when the material fuses.

2. The invention as defined in claim 1 including means for biasing the plunger against the fusible material and for pressing the switch against the plunger for closing the switch when the fusible material is intact.

3. The invention as defined in claim 1 wherein the actuator means includes standby means for holding the switch in open position and means for overcoming the standby means to close the switch by pressing the switch against the plunger.

4. The invention as defined in claim 1 wherein the actuator means includes spring means for holding the switch in open position and a fluid pressure operated actuator for overcoming the spring means to close the switch by pressing the switch against the plunger.

5. The invention as defined in claim 1 wherein the actuator means includes a fusible element for holding the switch in open position, a circuit for fusing the element, and spring means for closing the switch against the plunger when the element is fused.

6. In a circuit powered by a battery having a plurality of cells stacked in a linear array and being subject to overheating, means for limiting the cell temperature comprising:
 a switch in series with the battery and being closed during circuit operation, and
 means for opening the switch when cell temperature exceeds a set value including,
 a housing in thermal contact with the cells for receiving heat generated in the cells, the housing comprising an elongated tube having thermally conductive sections separated by insulating sections with each conductive section being thermally coupled with a respective cell in the array so that the housing is locally heated by each cell,
 a fusible material in the housing subject to the temperature of the housing for melting substantially at the set value,
 and actuator means coupling the switch with the fusible material for normally holding the switch closed and opening the switch when the material fuses.

7. In a circuit powered by a battery having a plurality of cells subject to overheating, means for limiting the cell temperature comprising:
 a switch in series with the battery and being closed during circuit operation, and
 means for opening the switch when cell temperature exceeds a set value including,
 a housing comprising a metal tube in thermal contact with the cells for receiving heat generated in the cells,
 a fusible material in the tube subject to the temperature of the tube for melting substantially at the set value, the fusible material comprising a plurality of fusible segments separated by nonfusible segments with all the segments being arranged in a column within the tube,
 and actuator means coupling the switch with the fusible material for normally holding the switch closed and opening the switch when the material fuses.

* * * * *